United States Patent Office 2,858,203
Patented Oct. 28, 1958

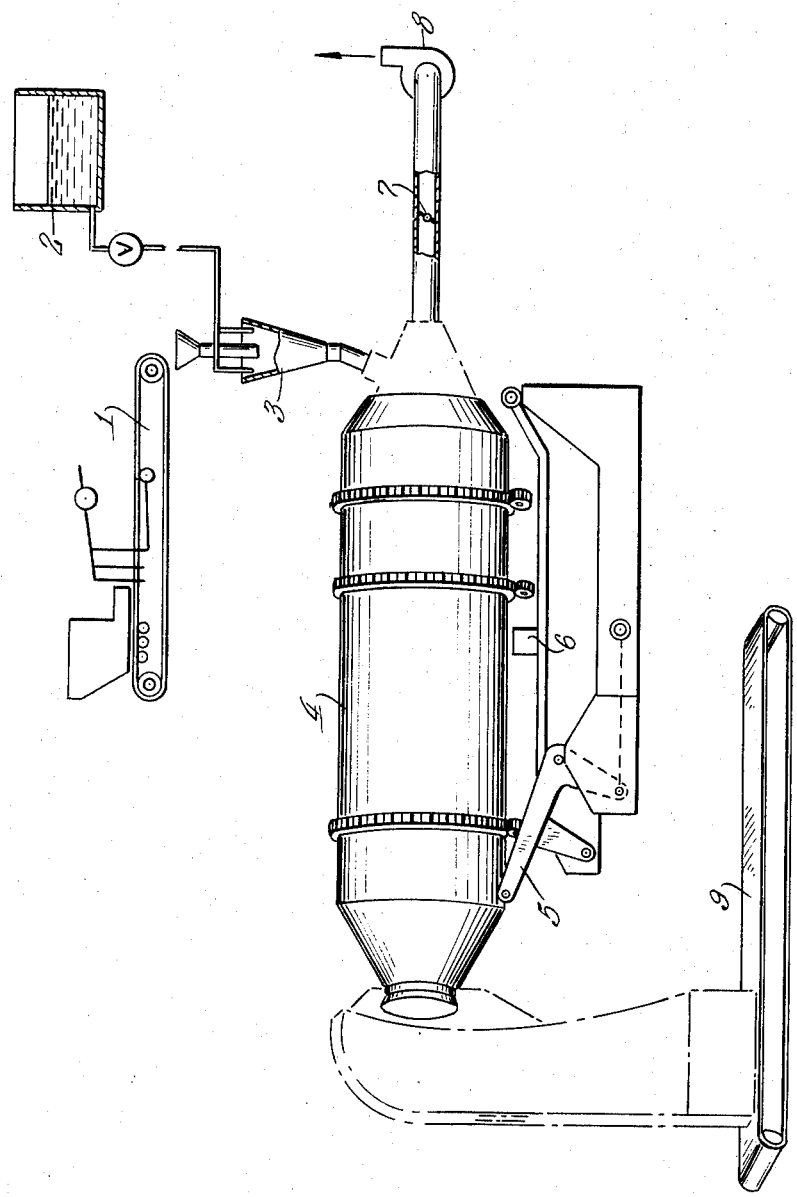

2,858,203
PROCESS FOR THE CONTINUOUS PRODUCTION OF SUPERPHOSPHATE

Giacomo Bellinzoni, Milan, Italy, assignor to Montecatini, Societa Generale per l'Industria Mineraria e Chimica, a corporation of Italy Application August 6, 1953, Serial No. 372,737

Claims priority, application Italy August 28, 1952

4 Claims. (Cl. 71—64)

According to the known processes, the production of mineral superphosphate is carried out in two distinct phases:

(a) *Mixing.*—In which the sulphuric acid and the ground phosphate, properly dosed, are introduced in a mixer where they are mixed and remain, under continuous agitation, for a more or less short time.

Here only a partial reaction between the two raw materials occurs, and a more or less fluid slurry is formed which is discharged into the den lying below, for the purpose of curing or setting.

(b) *Maturing or setting.*—Many types of this den are known but in all of these the slurry coming from mixing remains in the mixer for a more or less long time, that is for the time necessary for the completion of the initiated reactions and for the development of the gases and vapors produced by the same reactions.

The mass here takes consistence till becoming solid and porous, so that it may be easily pulverized.

The known working processes of superphosphate may be divided, moreover, in two types according to the duration of permanence in the den for the maturation.

In the older type, the semi-fluid slurry coming from the mixer is accumulated in great masses (by tens of metric tons) in the den, in which it must remain for some hours before, after completing the reaction and the development of the gases, the mass has become solid, porous and sufficiently dry in order to be extracted in the form of powder.

In the second and more recent type (for instance, Italian Patent No. 369,796 and its patents of addition Nos. 383,092 and 447,539), one obtains a pulverulent and stable superphosphate also with a very much shorter time of permanence than with the first type. In fact, it has been found that the reaction initiated in the mixer proceeds more rapidly if the slurry is collected in masses of limited volume.

In practice, when working with suitable containers and with masses of few quintals, the permanence of the superphosphate in the den may be limited to about half an hour. This can easily be misleading, because it may lead one to suppose that it is sufficient to subdivide the fluid slurry in ever smaller quantities in order to obtain in an always shorter time a superphosphate having the required physical-chemical properties.

It is, therefore, necessary to point out that the factors which influence the reactions interfere among themselves with contrasting effects. Indeed, while the fractionating of the mass facilitates the removal of the gaseous substances which are developing ($CO_2$, $HF$, $SiF_4$, $H_2O$-vapor) and favors the quick completion of the reaction and the formation of a spongy and soft product, on the other hand the excessive subdivision causes a considerable heat dispersion and therefore a lowering of the temperature with consequent slowing down or stopping of the same reaction.

Furthermore, the rapid diminution of $H_2O$, if not contained within determined limits, has an analogous effect because the water is the necessary means for the development of the ionic reactions.

From these observations it appears clearly evident how complicated is the study for establishing the best conditions to realize the reactions in a limited time for obtaining a soft, pulverulent superphosphate which, when gathered and put in a heap, avoids the characteristic phenomenon of hardening during the ripening, therefore facilitating the subsequent operations of recovery and shipment.

Through a series of experiences and ulteriorly developing the above-mentioned conceptions, I attained a new invention which is the object of the present application.

In general, it has been noticed that when maintaining the mass in a layer of limited thickness and in a state of continuous renewal, the gases and vapors which are formed by the reaction may develop more freely, allowing to the reacting substances a more intimate contact and a consequent quicker completion of the reaction.

It has been noted furthermore that an intimate relation exists between the thickness of the mass and the quantity of heat produced and developed and that it is therefore necessary to establish, for each type of phosphate, the more suitable thickness in order to obtain the most favorable temperature for the reaction and for the contemporaneous fixation of the water of crystallization.

This is very important because only when one operates within certain limits of temperature does it become possible to accelerate the completion of the reaction and the contemporaneous fixation of the water of crystallization, thus avoiding afterwards the phenomenon of setting and consequent blocking of the superphosphate in the storehouse.

In the industrial realization of the conception above mentioned, it follows that a continuous tubular den, composed of a tube rotating around its own axis at a controlled speed and inclination and in which the introduction of the reacting substances and also the suction of the gases are regulated, constitutes the most simple mechanical means for varying at will and rapidly the conditions of the reaction and realizes those which are determinant for the rapid and complete formation of superphosphate having a soft and pulverulent structure.

The essential characteristics of the new process hereinafter described and the apparatus employed for its execution will be better understood in considering the accompanying diagrammatical drawing.

The ground phosphate coming from a continuous measuring device 1 is introduced into a funnel conveyor 3, in which is introduced also sulphuric acid from the measuring device 2 at a determined temperature (for instance, 35° C.) and strength (for instance, 53–54° Bé.) and under a certain pressure.

The whirling movement of the acid carries at once the ground phosphate-acid mixture into the continuous tubular den 4. Practically no reaction and, therefore, no loss of heat or gas development occurs in this first phase.

The completion of mixing and the reactions occur exclusively in the den which is essentially constituted of an iron cylinder, internally lined with molten cement and pumice concrete, rotating around its own axis, provided with two truncated cone-shaped headpieces in order to allow the maintenance of the desired height of the layer of the reacting mass and in which the formation of superphosphate occurs, having a very good and stable final composition, in an extremely limited period of time (about 10 to 20 minutes).

The dimensions of the rotating cylinder, experienced practically with a production of 15–16 metric tons per hour, are: diameter=1.80 m., length=7 m., and the speed of forwarding the mass varies within 35–70 cm. per minute.

The numbers 5, 6 and 7 of the diagrammatical drawing indicate respectively the regulator of inclination, the regulator of the speed of the den, and the regulator for the suction of the gases, by means of which it is possible to regulate and control the operative characteristics of the process.

In fact, in varying the rotating speed of the cylinder, its inclination and the quantity of the reacting substances, more or less deep layers (for instance 30–35 cm.) of the reacting mass along the walls of the same cylinder may be obtained, said layers being subjected to well defined movements which facilitate the removal of the gaseous products and also maintain the reaction mass in a sufficient state of quiet, thus favoring the formation of a superphosphate with the desired characteristics.

The duration of time of the reaction, which may vary according to the types of phosphate but not exceed 20 minutes, is also adjustable in varying the inclination from 0–15° and the speed of rotation of the tube, while the temperature and the degree of moisture are to be regulated at once, at the beginning of the reaction, in varying opportunely, by means of the regulator 7, the motion of the gases by the blower 8.

The preferred temperature in the reacting mass is contained within the limits of 80–100° C., while the reduced pressure is low, for instance 2–5 mm. Hg.

At the end of the process and at the extremity of the den which forms the object of the present invention, the superphosphate, having reached its stable composition with porous structure (alveolar contact), passes to the pulverulent state through the slow movement of the den which turns around its own axis with an adjustable speed, that is from 1 revolution per 5 minutes to 1 revolution per minute.

The product leaving the den can be used and is conveyed to the storehouse by means of belt carrier 9.

Only because of the great facility of controlling the rotating den and for the particular mechanical devices chosen and studied with full particulars, as above mentioned, is it possible to avoid the phenomenon of the formation of hard balls in the product during the formation and to attain directly the production of soft, dry and pulverulent superphosphate.

Furthermore, such possibility of control permits the rapid realization of the best working conditions which, as obvious, vary according to the quality of the treated phosphorite.

Notwithstanding the shortening of the time of permanence of the superphosphate in the rotating den, from 10 to 20 minutes, preferably from 12 to 15 minutes, due above all to the renewal of the thin layer of superphosphate in reaction, the superphosphate obtained with whatever type of phosphorite does not present any sign of formation of hard balls in the form of granules or crust, which normally slows down the reactions.

The same motion of rotation of the den easily reduces the mass to powder without the necessity of mechanical crushing with consequent danger to make worse the physical qualities of the product on account of the phenomenon of thixotropia, owing to certain gels that are transformed into sols by mechanical action.

Another substantial characteristic of the new process is the great simplicity of the installation constituted in its essential part by a unique apparatus, due to the particularities of the above-mentioned system, which possess a very low installation cost also for high productions.

The invention, therefore, also concerns the apparatus employed for the realization of the process.

I claim:

1. Process for the continuous production of storage-stable, pulverulent superphosphate, comprising continuously measuring quantities of sulphuric acid and finely ground phosphate rock, intimately mixing said measured quantities of sulphuric acid and phosphate rock, continuously feeding the resulting reaction mixture into one end of a partly enclosed system, forming of the reaction mixture a layer 30 to 35 cm. high within said partly enclosed system, maintaining said layer at a temperature of 80 to 100° C., moving said layer at a speed resulting in a residence time of 10 to 20 minutes through said partly enclosed system while simultaneously exerting a transversal mixing effect upon said layer, applying a vacuum equal to 2–5 mm. Hg at the feed end of said partly enclosed system to expel reaction gases and water vapors, and withdrawing the reaction mixture at the other end of said partly enclosed system.

2. Process according to claim 1, comprising passing measured amounts of sulphuric acid under pressure in tangential contact with measured quantities of finely ground phosphate rock so as to cause an intimate mixture between said phosphate rock and said sulphuric acid and feeding the mixture into said partly enclosed system.

3. Process according to claim 1, comprising depositing a layer of said reaction mixture upon a cylindrical surface within said partly enclosed system, said cylindrical surface having sufficient declivity to intermingle said reaction mixture in a transverse direction upon rotating at a speed of 0.2–1 revolution per minute, rotating the cylindrical surface at said speed and regulating the discharge of said reaction mixture by inclining said cylindrical surface 0–15° against the horizontal.

4. Process according to claim 1, comprising maintaining said reaction mixture for 12–15 minutes within said partly enclosed system while advancing it 35–70 cm. per minute longitudinally and moving it agitatively, at a speed of less than 800 cm. per minute, along trajectories substantially transverse to the advance movement.

References Cited in the file of this patent

UNITED STATES PATENTS

| | | |
|---|---|---|
| 531,742 | Navarro | Jan. 1, 1895 |
| 1,879,479 | Punnett | Sept. 27, 1932 |
| 1,986,293 | Shoeld | Jan. 1, 1935 |
| 2,136,793 | Gabeler et al. | Nov. 15, 1938 |
| 2,232,145 | Shoeld | Feb. 18, 1941 |
| 2,265,358 | Denning | Dec. 9, 1941 |
| 2,287,759 | Hardesty et al. | June 23, 1942 |
| 2,504,545 | Waring | Apr. 18, 1950 |
| 2,618,547 | Davenport et al. | Nov. 18, 1952 |